United States Patent [19]
Erving et al.

[11] Patent Number: 5,187,741
[45] Date of Patent: Feb. 16, 1993

[54] ENHANCED ACOUSTIC CALIBRATION PROCEDURE FOR A VOICE SWITCHED SPEAKERPHONE

[75] Inventors: Richard H. Erving, Long Branch; Robert R. Miller, Convent Station, both of N.J.

[73] Assignee: AT&T Bell Laboratories, Murray Hill, N.J.

[21] Appl. No.: 620,603

[22] Filed: Nov. 30, 1990

[51] Int. Cl.$^5$ .............................................. H04M 1/60
[52] U.S. Cl. ................................... 379/388; 379/389; 379/390; 379/406; 370/32.1
[58] Field of Search ............... 379/387, 388, 389, 390, 379/406, 410, 411, 420; 370/32.1; 381/83

[56] References Cited

U.S. PATENT DOCUMENTS

| | | | |
|---|---|---|---|
| 3,725,585 | 4/1973 | Moniak et al. | 379/389 |
| 4,525,856 | 6/1985 | Admiral et al. | 381/83 |
| 4,571,461 | 2/1986 | Uno et al. | 379/390 |
| 4,715,063 | 12/1987 | Haddad et al. | 379/388 |
| 4,796,287 | 1/1989 | Reesor et al. | 379/390 |
| 4,887,288 | 12/1989 | Erving | 379/389 |
| 4,901,346 | 2/1990 | Erving | 379/389 |
| 4,959,857 | 9/1990 | Erving et al. | 379/390 |
| 4,979,163 | 12/1990 | Erving et al. | 379/388 |

*Primary Examiner*—James L. Dwyer
*Assistant Examiner*—M. Shehata
*Attorney, Agent, or Firm*—Samuel R. Williamson

[57] ABSTRACT

An acoustic calibration circuit in a voice switched adaptive speakerphone accurately determines the type of acoustic environment of both large and small rooms having either harsh or favorable acoustics. The calibration circuit determines the acoustic environment of a room by emitting a tone burst through a loudspeaker associated with the speakerphone and generating an echo decay parameter that is indicative of the duration of echoes from the tone burst signal measured with a microphone also associated with the speakerphone. The echo decay parameter is generated from a composite representation of the acoustic response for those echoes having the largest returned amplitude level measued at each one of multiple predetermined time intervals by the calibration circuit. By examining the amplitude levels in the composite representation at selected ones of the multiple predetermined time intervals, the echo decay parameter or estimate for the additional time required for the echoes to dissipate to a desired level is generated. If after performing a first measurement of the room acoustics at a prescribed first time period, the calibration circuit determines that the room echoes have not dissipated to an acceptable level in this first time period for generating a satisfactory echo decay parameter representative of these echoes, the calibration circuit regenerates the tone burst into the room a second time and then measures the resulting level of the acoustic response over an extended time period. From the echo decay parameter and the composite representation, a time-domain acoustic response is generated. This time-domain acoustic response provides an estimate of both the maximum returned amplitude and expected duration of the echoes. This information is then used by the speakerphone in adapting its operating parameters. If the room acoustics are harsh, the speakerphone adapts by keeping its switching response comparable with that of a typical analog speakerphone. If acoustics are favorable, however, it speeds up the switching time, lowers both the break in thresholds and the total amount of inserted switched loss.

23 Claims, 10 Drawing Sheets

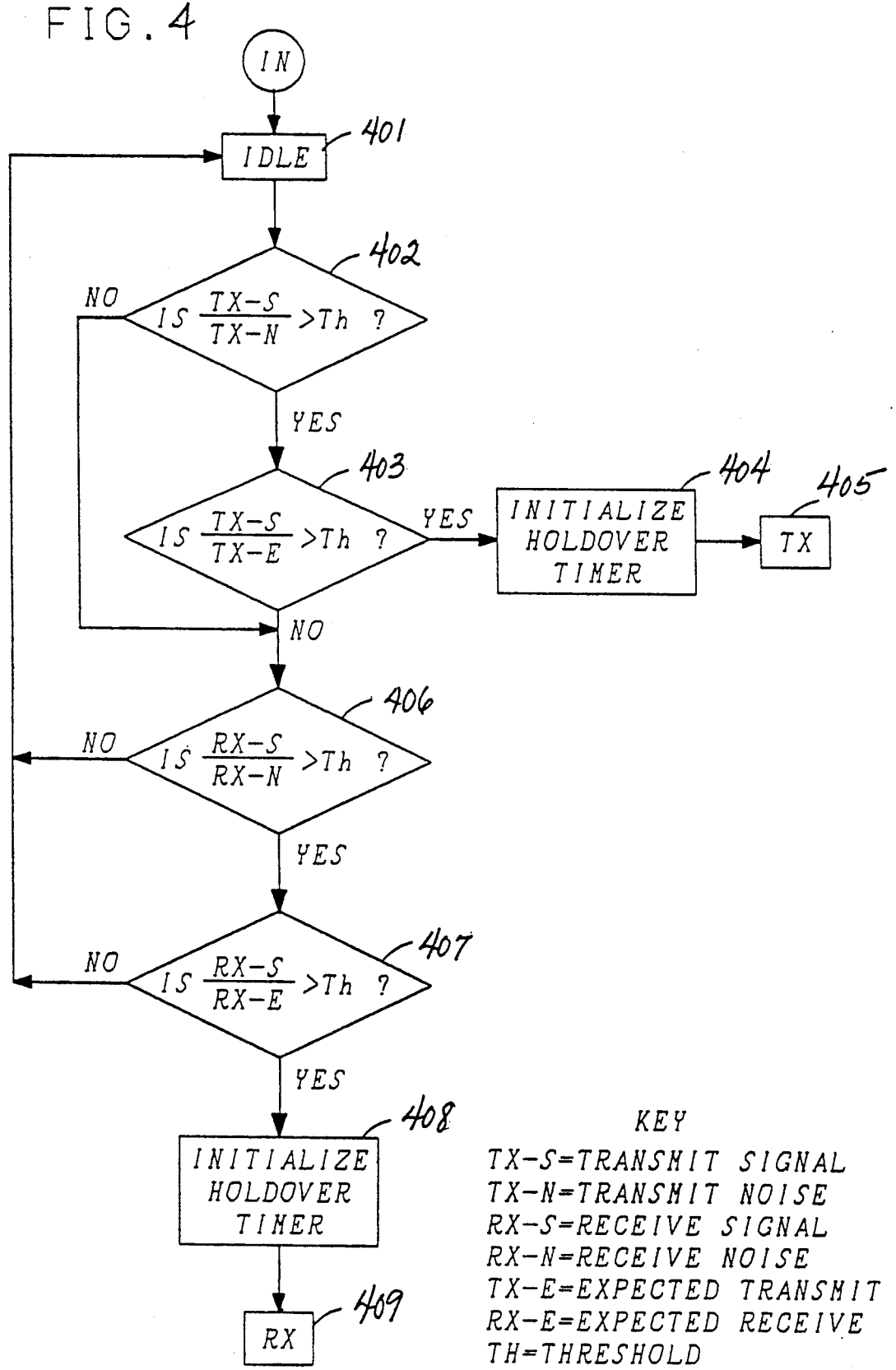

KEY
TX-S=TRANSMIT SIGNAL
TX-N=TRANSMIT NOISE
RX-S=RECEIVE SIGNAL
RX-N=RECEIVE NOISE
TX-E=EXPECTED TRANSMIT
RX-E=EXPECTED RECEIVE
Th=THRESHOLD

KEY

D = DESIRED ECHO DECAY LEVEL
$t_1 \cdots t_{10}$ = ACOUSTIC SAMPLE PERIODS
d = ACTUAL ECHO DECAY LEVEL
$t_p$ = ECHO DECAY PARAMETER
x = RESPONSE OF ROOM WITH FAVORABLE ACOUSTICS
● = RESPONSE OF ROOM WITH HARSH ACOUSTICS

ENHANCED ACOUSTIC CALIBRATION PROCEDURE FOR A VOICE SWITCHED SPEAKERPHONE

BACKGROUND OF THE INVENTION

1. Technical Field

This invention relates to audio systems and, more particularly, to voice switching circuits which connect to an audio line for providing two-way voice switched communications.

2. Description of the Prior Art

The use of analog speakerphones has been the primary "hands free" means of communicating during a telephone conversation for a great number of years. This convenience has been obtained at the price of some limitations, however. Known speakerphones usually require careful and expensive calibration in order to operate in an acceptable manner. They are also designed to operate in a worst-case acoustic environment, thereby sacrificing the improved performance that is possible in a better acoustic environment.

The operation of conventional analog speakerphones is well known and is described in an article by A. Busala, "Fundamental Considerations in the Design of a Voice-Switched Speakerphone," Bell System Technical Journal, Vol. 39, No. 2, March 1960, pp. 265–294. Analog speakerphones generally use a switched-loss technique through which the energy of the voice signals in both a transmit and a receive direction are sensed and a switching decision made based upon that information. The voice signal having the highest energy level in a first direction will be given a clear talking path and the voice signal in the opposite direction will be attenuated by having loss switched into its talking path. If voice signals are not present in either the transmit direction or the receive direction, the speakerphone typically goes to an "at rest" mode which provides the clear talking path to voice signals in a receive direction thereby favoring speech from a distant speaker. In some modern analog speakerphones, however, if voice signals are not present in either the transmit direction or the receive direction, the speakerphone goes to an idle mode where the loss in each direction is set to a mid-range level to allow the direction in which voice signals first appear to quickly obtain the clear talking path.

Most high-end analog speakerphones also have a noise-guard circuit to adjust the switching levels according to the level of background noise present. Switching speed is limited by a worst-case time constant that assures that any speech energy in the room has time to dissipate. This limitation is necessary to prevent "self switching", a condition where room echoes are falsely detected as near-end speech. A disadvantage of this type of speakerphone is that no allowance is made for a room that has good acoustics, i.e., low echo energy return and short duration echoes.

One recently developed speakerphone includes an arrangement that does consider the quality of the acoustics in a room and adapts its operating parameters accordingly. This arrangement is disclosed in U.S. Pat. No. 4,959,857, which issued to R. H. Erving and R. R. Miller, II on Sep. 25, 1990. This arrangement includes a calibration circuit which measures the acoustics of the room by emitting a tone burst through a loudspeaker associated with the speakerphone and measuring the returned time-domain acoustic response with a microphone also associated with the speakerphone. The measured time-domain acoustic response in this arrangement is indicative of the dissipation of the echoes in the room over a predetermined time period during which the echoes must dissipate to an acceptable level. Such an arrangement has been found satisfactory when the speakerphone is operating in a small room, such as an individual office, where typically a small loudspeaker and a microphone having limited sensitivity are employed. In such an arrangement, the loudspeaker does not generate enough acoustic energy nor does the microphone have enough gain to detect those echoes within the room that persist for durations longer than the measured time-domain acoustic response provided by this arrangement.

Where it is necessary to conference a large number of individuals, for example, the audience in a large conference room or auditorium, the conference environment requires a high gain loudspeaker and a sensitive directional microphone such as are provided in the microphone arrangement disclosed in U.S. Pat. No. 4,311,874 issued to R. L. Wallace, Jr. on Jan. 19, 1982. Unfortunately, due to the increased gain in the loudspeaker over that in the arrangement discussed above, the loudspeaker has the ability to charge the room with a tremendous amount of energy, especially if such a room does not have good acoustics. And the increased sensitivity of the microphone enables the continuous detection of these echoes to a much lower level. Thus the echoes in the room may remain at a detectable level long after the allotted period for measuring the time-domain acoustic response has expired. As a result, the echo duration information measured by the speakerphone may not be sufficient in a conference environment to prevent the speakerphone from self-switching. It is thus desirable to provide an arrangement which does not suffer from this problem.

SUMMARY OF THE INVENTION

In accordance with the present invention, an arrangement is employed in an adaptive speakerphone for accurately determining the type of acoustic environment in which the speakerphone is employed. The arrangement includes an acoustic calibration circuit operative in determining the acoustic environment of both large and small rooms having either harsh (bad) or favorable (good) acoustics. In preferred embodiments, the calibration circuit determines the acoustic environment of the room by emitting a tone burst through a loudspeaker associated with the speakerphone and generating an echo decay parameter that is indicative of the duration of echoes from the tone burst signal measured with a microphone also associated with the speakerphone. More specifically, the echo decay parameter provides an estimate for a specific time interval when the amplitude level of the acoustic response for the tone burst signal dissipates to a predetermined level.

For generating the echo decay parameter, the calibration circuit first generates a composite representation of the acoustic response for those echoes having the largest returned amplitude level measured over multiple predetermined time intervals. By examining the amplitude level in the composite representation at selected ones of these time intervals, the echo decay parameter is generated. And from the echo decay parameter and the composite representation, a time-domain acoustic response, which provides a measure of the characterization of the room acoustic environment, is determined.

If after performing a first measurement of the room acoustics at a prescribed first time period, the calibration circuit determines that the room echoes have not dissipated to an acceptable level for generating an echo decay parameter representative of these echoes, in accordance with the invention the calibration circuit regenerates the tone burst into the room a second time and then measures the resulting level of the acoustic response over an extended time period.

In one aspect of the invention, the acoustic calibration circuit is associated with a voice switching apparatus and determines the type of acoustic environment in which the voice switching apparatus is employed. The calibration circuit comprises means for generating a tone burst signal in said environment, the tone burst signal comprising multiple frequency signals being generated separately at different time intervals. The calibration circuit further comprises scaling means responsive to the return of the tone burst signal to said apparatus for generating an echo decay parameter indicative of the duration of echoes from the tone burst signal and for providing a time-domain acoustic response of said environment. The calibration circuit still further comprises calibration means operably responsive to the scaling means for adjusting threshold switching levels at which the apparatus switches between the receive state and the transmit state.

In further accordance with the invention, the time-domain acoustic response provides an estimate of both the maximum amplitude of the returned signal and the expected duration of the echoes. This information is used by a computer in the speakerphone in adapting its operating parameters. The amplitude of the returned signal determines what level of transmit speech will be required to break in on receive speech. The greater the acoustic return, the higher that threshold must be to protect against self-switching. And the duration of the echoes determine how quickly speech energy injected into the room will dissipate, which, in turn, controls how fast the speakerphone can switch from a receive to a transmit state. If the room acoustic are harsh, the speakerphone adapts by keeping its switching response comparable with that of a typical analog speakerphone. If acoustics are favorable, however, it speeds up the switching time, lowers both the break in thresholds and the total amount of inserted switched loss.

BRIEF DESCRIPTION OF THE DRAWING

The invention and its mode of operation will be more clearly understood from the following detailed description when read with the appended drawing in which:

FIG. 4 depicts a flow chart illustrating the operation of the speakerphone of FIG. 2 in determining whether to remain in an idle state or to move from the idle state to a transmit or a receive state;

DETAILED DESCRIPTION

Figure 1:
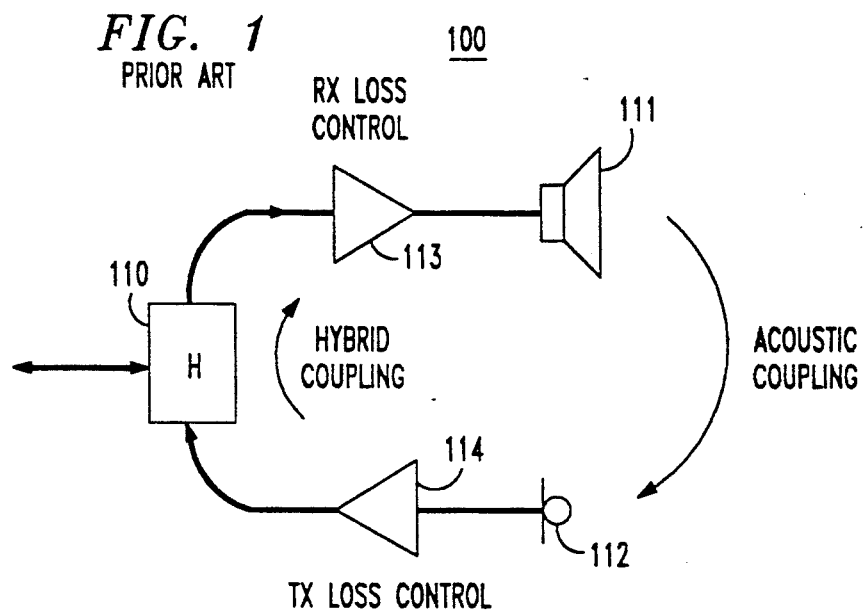
FIG. 1 depicts a general speakerphone circuit and two types of coupling that most affect its operation.

Referring now to FIG. 1, there is shown a general speakerphone circuit 100. This circuit can be advantageously used to illustrate the two types of coupling, hybrid and acoustic, that most affect the operation of a speakerphone being employed in a telephone connection. A hybrid 110 connects the transmit and receive paths of the speakerphone to a telephone or other communication line whose impedance may vary depending upon, for example, its length from a central office, as well as, for example, other hybrids in the connection. And the hybrid only provides a best case approximation to a perfect impedance match to this line. Thus a part of the signal on the transmit path to the hybrid returns over the receive path as hybrid coupling. Given this limitation and the inevitable acoustic coupling between a loudspeaker 111 and a microphone 112, transmit and receive loss controls 113 and 114 are inserted in the appropriate paths to avoid regenerative feedback or singing.

Figure 2:
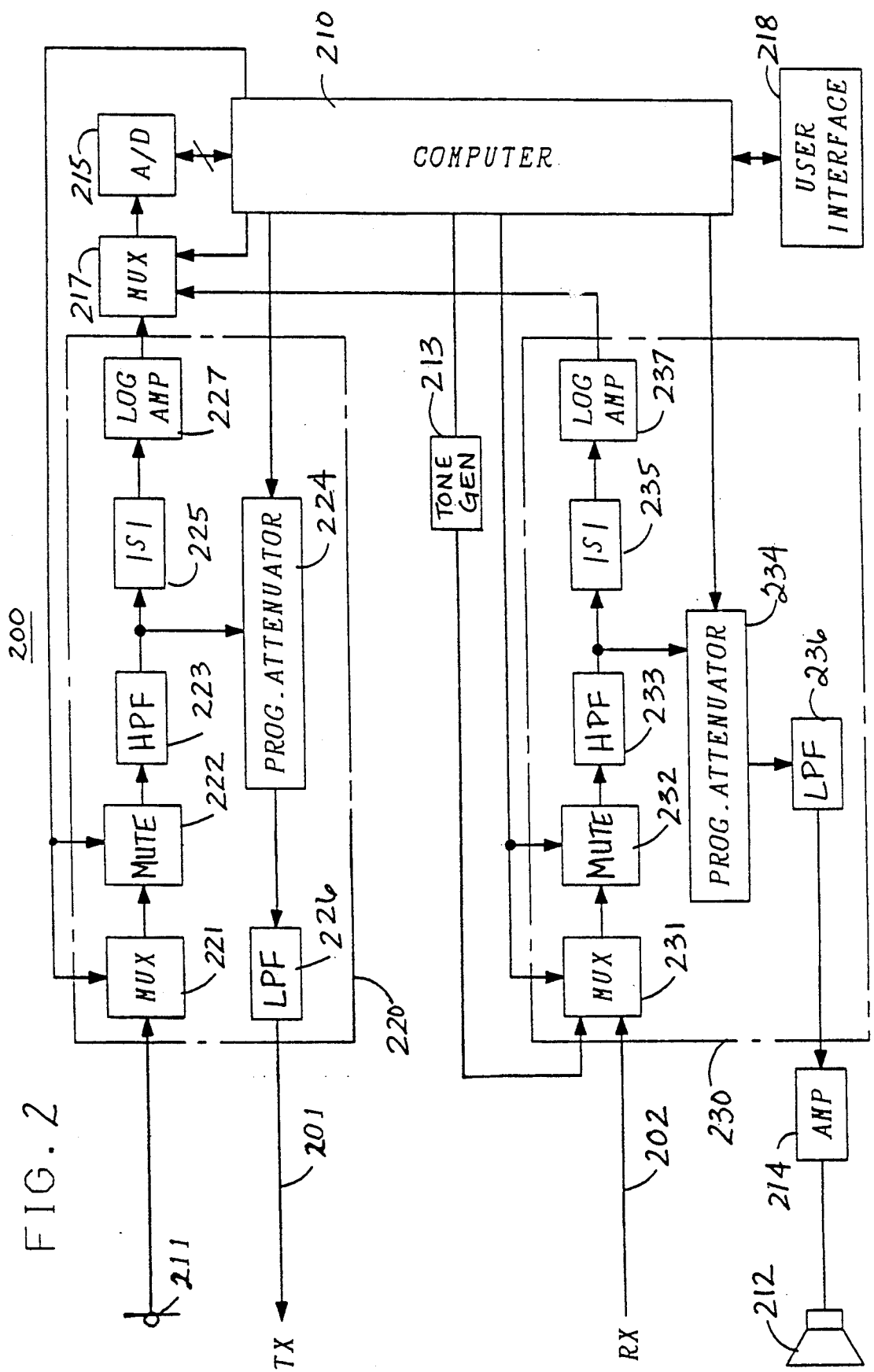
FIG. 2 is a block representation of the major functional components of a computer-controlled adaptive speakerphone operative in accordance with the principles of the invention.

Referring next to FIG. 2, there is shown a functional block representation of a computer controlled adaptive speakerphone 200 operative in accordance with the principles of the invention. As shown, the speakerphone generally comprises a computer 210, a transmit section 220 and a receive section 230. A microcomputer commercially available from Intel Corporation as Part No. 8051 may be used for computer 210 with the proper programming. A microphone 211 couples audio signals to the speakerphone and a speaker 212 receives output audio signals from the speakerphone.

In the operation of the speakerphone 200, an audio signal provided by a person speaking into the microphone 211 is coupled into the transmit section 220 to a multiplexer 221. Connected to the multiplexer 221 is a mute control 222 which mutes the transmit path in response to a control signal from the computer 210. A high pass filter 223 connects to the mute control 222 to remove the room and low frequency background noise in the speech signal. The output of the high pass filter 223 is coupled both to a programmable attenuator 224 and to an envelope detector 225 having a transfer function S. In response to a control signal from the computer 210, the programmable attenuator 224 inserts loss in the speech signal in steps of 3.5 dB up to a total of sixteen steps, providing a maximum loss of 56 dB. This signal from the programmable attenuator 224 is coupled to a low pass filter 226 which removes any spikes that might have been generated by the switching occurring in the attenuator 224. This filter also provides additional signal shaping to the signal before the signal is transmitted by the speakerphone over audio line 201 to a hybrid (not shown). After passing through the envelope detector 225, the speech signal from the filter 223 is coupled to a logarithmic amplifier 227, which expands the dynamic range of the transmit signal to approximately 60 dB to allow for the optimum utilization of the quantizing range of the analog-to-digital converter 215.

The receive section 230 contains speech processing circuitry that is functionally the same as that found in the transmit section 220. Specifically, a speech signal received over an input audio line 202 from the hybrid is coupled into the receive section 230 to the multiplexer 231. Connected to the multiplexer 231 is a mute control 232 which mutes the receive path in response to a control signal from the computer 210. A high pass filter 233 is connected to the mute control 232 to remove the low frequency background noise from the speech signal.

The output of the high pass filter 233 is coupled both to an envelope detector 235 and to a programmable attenuator 234. The envelope detector 235 obtains the signal envelope of the speech signal, the envelope then being coupled to a logarithmic amplifier 237. This amplifier expands the dynamic range of the received speech signal to approximately 60 dB to allow for the optimum utilization of the quantizing range of the analog-to-digital converter 215. The programmable attenuator 234, responsive to a control signal from the computer 210, inserts loss in the speech signal in steps of 3.5 dB in sixteen steps, for a maximum loss of 56 dB. This signal from the programmable attenuator 234 is coupled to a low pass filter 236 which removes any spikes that might have been generated by the switching occurring in the attenuator 234. This filter also provides additional signal shaping to the signal before the signal is coupled to the loudspeaker 212 via an amplifier 214.

The signals from both the logarithmic amplifier 227 and the logarithmic amplifier 237 are multiplexed by multiplexer 217 and provided to the analog-to-digital converter 215. The converter 215 presents the computer 210 with digital information about the signal levels every 750 microseconds.

The computer 210 measures the energy of the incoming signals and develops information about the signal and noise levels. Both a transmit signal average and a receive signal average are developed by averaging samples of each signal according to the following equation:

$$\hat{y}_t = \begin{cases} \hat{y}_{t-1} + \dfrac{|s|_t - \hat{y}_{t-1}}{4} & \text{if } |s|_t \geq \hat{y}_{t-1} \\ \hat{y}_{t-1} + \dfrac{|s|_t - \hat{y}_{t-1}}{32} & \text{if } |s|_t < \hat{y}_{t-1} \end{cases}$$

where
Sampling rate = 1333 per second
$|s|_t$ = new sample
$t-1$ = old average
$t$ = new average.

This averaging technique tends to pick out peaks in the applied signal. Since speech tends to have many peaks rather than a constant level, this measurement facilitates the detecting of these speech signals.

Both a transmit noise average and a receive noise average are also developed. The transmit noise average determines the noise level of the operating environment of the speakerphone. The receive noise average measures the noise level on the line from the far-end party. The transmit noise average and the receive noise average are both developed by measuring the lowest level seen by the converter 215. Since background noise is generally constant, the lowest samples provide a reasonable estimate of the noise levels. The transmit and receive noise averages are developed using the following equation:

$$\hat{y}_t = \begin{cases} \hat{y}_{t-1} + \dfrac{|s|_t - \hat{y}_{t-1}}{4096} & \text{if } |s|_t \geq \hat{y}_{t-1} \\ \hat{y}_{t-1} + \dfrac{|s|_t - \hat{y}_{t-1}}{4} & \text{if } |s|_t < \hat{y}_{t-1} \end{cases}$$

where
Sampling rate = 1333 per second
$|s|_t$ = new sample
$t-1$ = old average
$t$ = new average.

This equation strongly favors minimum values of the envelope of the applied signal, yet still provides a path for the resulting average to rise when faced with a noisier environment.

Two other signal levels are developed to keep track of the loop gain, which affects the switching response and singing margin of the speakerphone. These signal levels are the speech level that is present after being attenuated by the transmit attenuator 224 and the speech level that is present after being attenuated by the receive attenuator 234. In the speakerphone, these two levels are inherently known due to the fact that the computer 210 directly controls the loss in the attenuators 224 and 234 in discrete amounts, which as noted above is introduced in 3.5 dB steps with a maximum loss of 56 dB in each attenuator. All of these levels are developed to provide the computer 210 with accurate and updated information about what the current state of the speakerphone should be.

In order to execute an acoustic calibration process, the speakerphone includes calibration circuitry for measuring the acoustics of the room in which it operates. The calibration circuitry advantageously determines the acoustic environment of both large and small rooms having either harsh (bad) or favorable (good) acoustics. The calibration process needs to be performed only when the speakerphone is initially situated in the room and first turned on for operation, or when the speakerphone is relocated in the room. Also, acoustic calibration is not necessary just prior to or after placing a telephone call.

Through use of, in combination, the computer 210, a tone generator circuit 213, the transmit section 220 and the receive section 230, all of which comprise the calibration circuitry, the speakerphone generates a tone burst signal comprising a series of 20 millisecond tone bursts throughout the audible frequency range of interest and uses the resulting echoes to determine the time-domain acoustic response of the room. Each tone burst is sent from the tone generator circuit 213 through the receive section 230 and out the loudspeaker 212. The integrated response, which is reflective of the echoes in the room from each tone burst, is picked up by the microphone 211 and coupled via the transmit section 220 to the computer 210 where it is stored as a composite representation or response pattern, shown in FIG. 7 and described in greater detail later herein.

The time-domain acoustic response is characterized by two important factors: the maximum amplitude of the returned signal and the actual or expected duration of the echoes. This information is used by computer 210 in adapting its operating parameters. The amplitude of the returned signal determines what level of transmit speech will be required to break in on receive speech. The greater the acoustic return, the higher that threshold must be to protect against self-switching. And the duration of the echoes determine how quickly speech energy injected into the room will dissipate, which, in turn, controls how fast the speakerphone can switch from a receive to a transmit state. If the room acoustics are harsh, i.e., high echo return and long duration echoes, the speakerphone adapts by keeping its switching response comparable with that of a typical analog speakerphone. If acoustics are favorable, however, it speeds up the switching time and lowers both the total amount of inserted switched loss and the break in thresholds thereby providing a noticeable improvement in performance.

If the acoustic environment in which the speakerphone is employed has favorable acoustics, the composite representation accurately characterizes the room acoustics and is thus able to serve directly as the time-domain acoustic response for the room. In a room that has harsh acoustics, however, a composite representation for this room measured with a similar time period can not adequately characterize the acoustics of this room since the echoes in such a room generally remain at a detectable level long after the allotted period for measuring the composite representation has expired. Thus, in order to adequately characterize a room with harsh acoustics, the composite representation must be taken over a much longer time period than that required for a room with favorable acoustics. But to use one common extended time period for measuring both types of rooms has the disadvantage of degrading the resolution of the composite representation taken for those rooms with favorable acoustics, or, alternatively, the measurement for those rooms with favorable acoustics is taken in such a slow manner that it becomes objectional to the user.

In those rooms having harsh acoustics, the time-domain acoustic response is determined by the calibration circuitry by first generating an echo decay parameter that is indicative of the duration of the echoes in a room. Operation of the echo decay parameter in providing an accurate characterization of the acoustic environment for those rooms with harsh acoustics is described in detail later herein with reference to the waveform of FIG. 8 and the flow chart of 9.

The concept of self-calibration is also applied to the speakerphone's interface to a hybrid. During a conversation, the computer measures the degree of hybrid reflection that it sees. This hybrid reflection provides a measure of both the hybrid and far-end acoustic return. Its average value is determined using the following equation:

$$\hat{H}_t = \begin{cases} \hat{H}_{t-1} + \dfrac{(\hat{R}_t - \hat{T}_t) - \hat{H}_{t-1}}{4096} & \text{if } (\hat{R}_t - \hat{T}_t) \geq \hat{H}_{t-1} \\ \hat{H}_{t-1} + \dfrac{(\hat{R}_t - \hat{T}_t) - \hat{H}_{t-1}}{4} & \text{if } (\hat{R}_t - \hat{T}_t) < \hat{H}_{t-1} \end{cases}$$

where
Sampling rate = 1333 per second
$_t$ = receive signal average
$_t$ = transmit signal average
$_{t-1}$ = old hybrid average
$_t$ = new hybrid average.

This equation develops the hybrid average value by subtracting a transmit signal from a receive signal and then averaging these signals in a manner that favors the maximum difference between them. The receive signal is that signal provided to the speakerphone by the hybrid on the receive line and the transmit signal is that signal provided to the hybrid by the speakerphone on the transmit line. By developing an estimate of the hybrid average, the amount of switched loss required in the speakerphone to maintain stability may be raised or lowered. By lowering the amount of switched loss, speakerphone switching operation becomes more transparent and can even approach full-duplex for fully digital connections.

The estimate of the hybrid average is also used to determine the switching threshold level of the speakerphone in switching from the transmit state to the receive state (receive break in). Since the estimate of the hybrid average is used to develop an expected level of receive speech due to reflection, additional receive speech due to the far-end talker may be accurately determined and the state of the speakerphone switched accordingly.

To obtain an accurate representation of the line conditions, hybrid averaging is performed only while the speakerphone is in the transmit state. This insures that receive speech on the receive line during a quiet transmit interval cannot be mistaken for a high level of hybrid return. This averaging therefore prevents receive speech, that is not great enough to cause the speakerphone to go into the receive state, from distorting the estimated hybrid average.

Another boundary condition employed in developing this hybrid average is a limitation on the acceptable rate of change of transmit speech. If transmit speech ramps up quickly, then the possibility of sampling errors increases. To avoid this potential source of errors, the hybrid average is only developed during relatively flat intervals of transmit speech (the exact slope is implementation-dependent).

To ensure stable operation with an adaptive speakerphone in use at both the near-end and the far-end by both parties, the amount that the hybrid average may improve during any given transmit interval is also limited. In the adaptive speakerphone 100, for example, the hybrid average is allowed to improve no more than 5 dB during each transmit state. In order for the hybrid average to improve further, a transition to receive and then back to transmit must be made. This insures that the far-end speakerphone has also has an opportunity to go into the transmit state and has similarly adapted. Thus, each speakerphone is able to reduce its inserted loss down to a point of balance in a monotonic fashion. Limiting the amount of change in the hybrid average during a transmit interval also allows this speakerphone to to be operable with other adaptive speakerphones such as echo-canceling speakerphones that present a varying amount of far-end echo as they adapt.

For ease of operation and for configuring the speakerphone, a user interface 218 through which the user has control over speakerphone functions is provided as part of to the speakerphone 100. This interface includes such speakerphone functions as ON/OFF, MUTE and VOLUME UP/DOWN. The user interface also includes a button or other signaling device for initiating the recalibration process. Should the user relocate his or her speakerphone, pressing this button will perform an acoustic calibration to the new environment. In addition, the recalibration process resets the volume level of the speakerphone to the nominal position.

Figure 3:
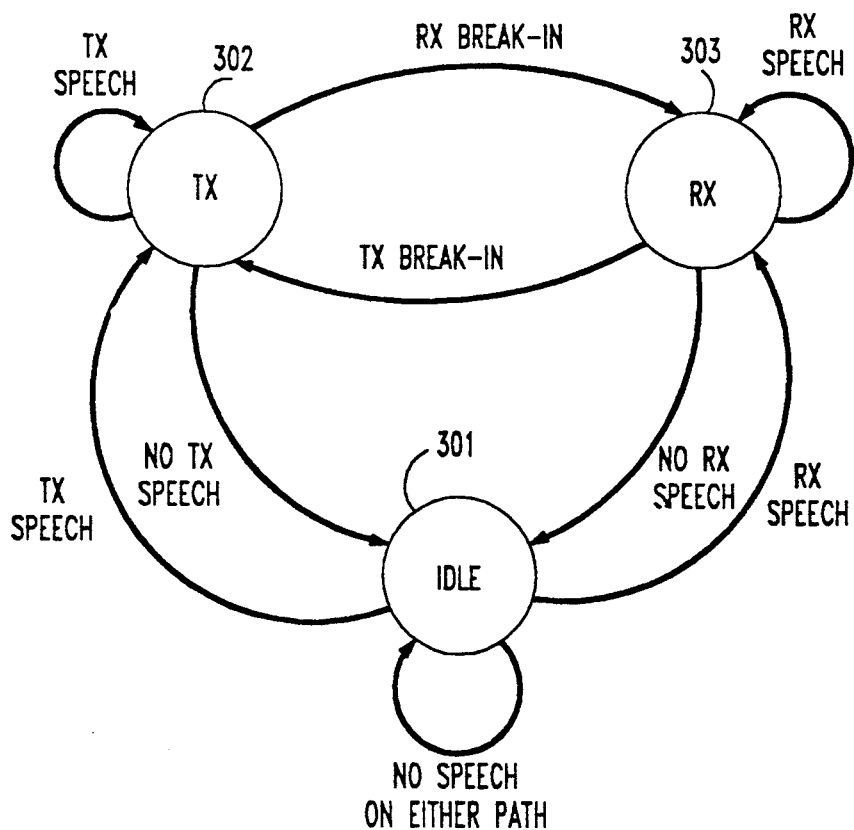
FIG. 3 is a state diagram depicting the three possible states of the speakerphone of FIG. 2 and the possible transitions among them.

The computer controlled adaptive speakerphone 200 of FIG. 2 advantageously employs a process or program described herein with reference to a state diagram of FIG. 3 and flow diagrams of FIGS. 4, 5, 6 and 9. For improved performance, the various parameters used in carrying out the processes are defined using the time-domain acoustic response as set forth herein in accordance with the principles of the present invention. This process dynamically adjusts the operational parameters of the speakerphone for the best possible performance in view of existing hybrid and acoustic coupling conditions.

Referring now to FIG. 3, there is shown the state diagram depicting the possible states of the speakerphone 200. The speakerphone initializes in an idle state 301. While in this state, the speakerphone has a symmetrical path for entering into either a transmit state 302 or a receive state 303, according to which of these two has the stronger signal. If there is no transmit or receive speech while the speakerphone is in the idle state 301, the speakerphone remains in this state as indicated by a loop out of a back into this idle Generally, if speech is detected in the transmit or receive path, the speakerphone moves to the corresponding transmit or receive state. If the speakerphone has moved to the transmit state 302, for example, and transmit speech continues to be detected, the speakerphone then remains in this state. If the speakerphone detects receive speech having a stronger signal than the transmit speech, a receive break-in occurs and the speakerphone moves to the receive state 303. If transmits speech ceases and no receive speech is present, the speakerphone returns to the idle state 301. Operation of the speakerphone in the receive state 303 is essentially the reverse of its operation in the transmit state 302. Thus if there is receive speech following the speakerphone moving to the receive state 303, the speakerphone stays in this state. If transmit speech successfully interrupts, however, the speakerphone goes into the transmit state 302. And if there is not receive speech while the speakerphone is in the receive state 303 and no transmit speech to interrupt, the speakerphone returns to the idle state.

Referring next to FIG. 4, there is shown a flow chart illustrating in greater detail the operation of the speakerphone 200 in determining whether to remain in the idle state or move from the idle state to the transmit state or receive state. The process is entered at step 401 wherein the speakerphone is in the idle state. From this step, the process advances to the decision 402 where it determines whether the detected transmit signal is greater than the transmit noise by a certain threshold. If the detected transmit signal is greater than the transmit noise by the desired amount, the process proceeds to decision 403. At this decision, a determination is made as to whether the detected transmit signal exceeds the expected transmit signal by a certain threshold.

The expected transmit signal is that component of the transmit signal that is due to the receive signal coupling from the loudspeaker to the microphone. This signal will vary based on the receive speech signal, the amount of switched loss, and the acoustics of the room as determined during the acoustic calibration process. The expected transmit level is used to guard against false switching that can result from room echoes; therefore, the transmit level must exceed the expected transmit level by a certain threshold in order for the speakerphone to switch into the transmit state.

If the detected transmit signal does not exceed the expected transmit signal by the threshold, the process advances to decision 406. If the detected transmit signal exceeds the expected transmit signal by the threshold, however, the process advances to step 404 where a holdover timer is initialized prior to the speakerphone entering the transmit state. Once activated, this timer keeps the speakerphone in either the transmit state or the receive state over a period of time, approximately 1.2 seconds, when there is no speech in the then selected state. This allows a suitable period for bridging the gap between syllables, words and phrases that occur in normal speech. From step 404 the process advances to step 405 where the speakerphone enters the transmit state.

Referring once again to step 402, if the detected transmit signal is not greater than the transmit noise by a certain threshold, then the process advances to the decision 406. In this decision, and also in decision 407, the receive path is examined in the same manner as the transmit path in decision 402 and 403. In decision 406, the detected received signal is examined to determine if it is greater than the receive noise by a certain threshold. If the detected receive signal is not greater than the receive noise by this threshold, the process returns to the step 401 and the speakerphone remains in the idle state. If the detected receive signal is greater than the receive noise by the desired amount, the process proceeds to decision 407. At this decision, a determination is made as to whether the detected receive signal exceeds the expected receive signal by a certain threshold.

The expected receive signal represents the amount of speech seen on the receive line that is due to transmit speech coupled through the hybrid. This signal is calculated on an ongoing basis by the speakerphone and depends on the hybrid average, the amount of switched loss, and the transmit speech signal. Since the transmit speech path is open to some extent while the speakerphone is in the idle state, this causes a certain amount of hybrid reflection to occur, which, in turn, causes a certain amount of the speech signal detected on the receive path to be due to actual background noise or speech in the room. This, in turn, is read as a certain expected level of receive speech. And the actual receive speech signal must surpass this expected level by the threshold in order for the speakerphone to determine with certainty that there is actually a far-end party talking.

If the detected receive signal does not exceed the expected receive signal by the threshold, the process returns to the step 401 and the speakerphone remains in the idle state. If the detected receive signal exceeds the expected receive signal by the threshold, however, the process advances to step 408 where the holdover timer is initialized. From step 408 the process advances to step 409 where the speakerphone is directed to enter the receive state.

Figure 5:
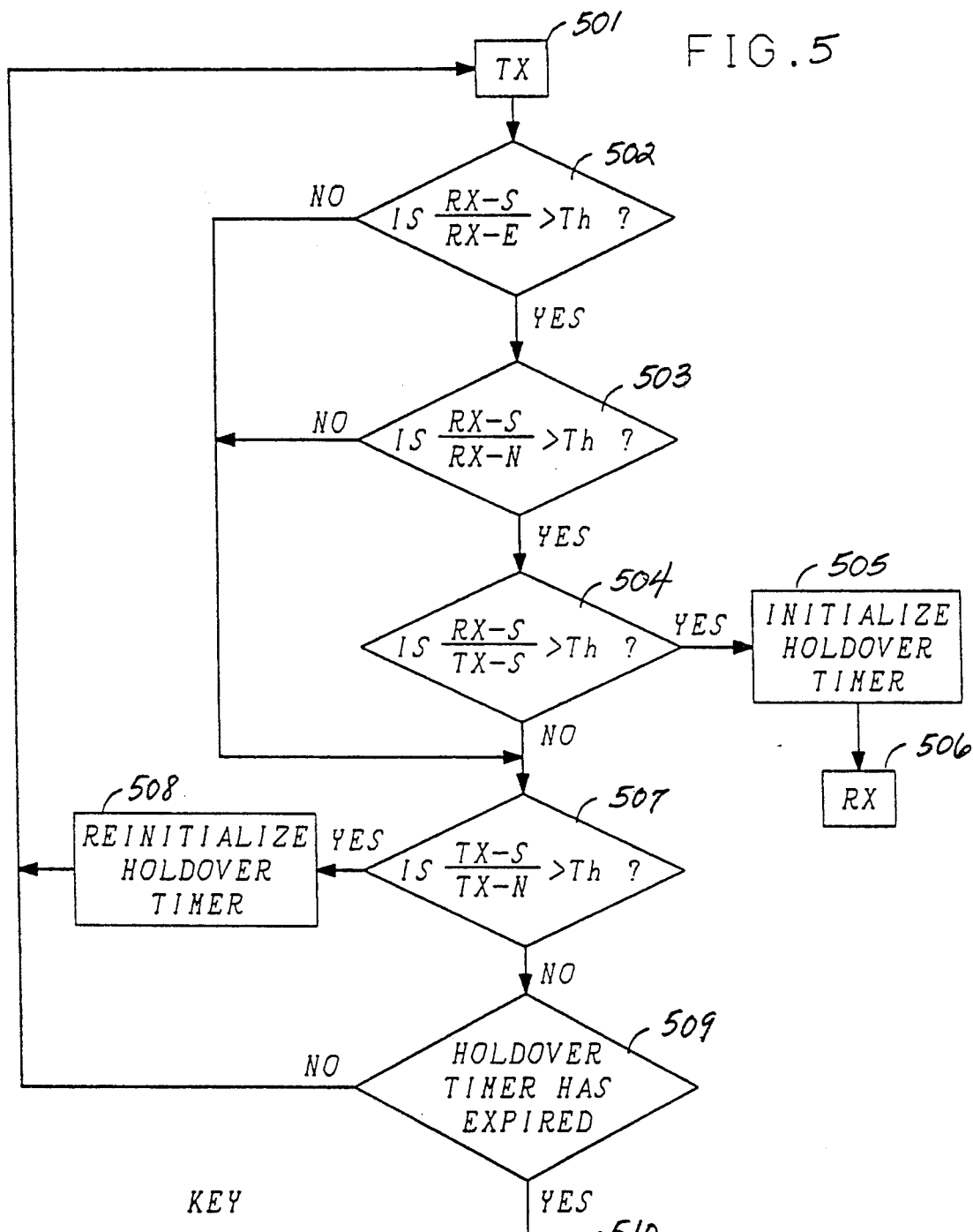
FIG. 5 depicts a flow chart illustrating the operation of the speakerphone of FIG. 2 in determining whether to remain in the transmit state or to move from the transmit state to the receive state or idle state.

Referring next to FIG. 5, there is shown a flow chart illustrating in greater detail the operation of the speakerphone 200 in determining whether to remain in the transmit state or move from the transmit state to either the receive state or idle state. The process is entered at step 501 wherein the speakerphone has entered the transmit state. From this step, the process advances to the decision 502 where a determination is made as to whether the detected receive signal exceeds the expected receive signal by a certain threshold. If the detected receive signal does not exceed the expected receive signal by the threshold, the process advances to decision 507. If the detected receive signal exceeds the expected receive signal by the threshold, however, the process advances to step 503 where the detected received signal is examined to determine if it is greater than the receive noise by a certain threshold. If the detected receive signal is not greater than the receive noise by this threshold, the process advances to decision 507. If the detected receive signal is greater than the receive noise by the desired amount, the process proceeds to decision 504.

At decision 504, a determination is made as to whether the detected receive signal is greater than the detected transmit signal by a certain threshold. This decision is applicable when the near-end party and the far-end party are both speaking and the far-end party is attempting to break-in and change the state of the speakerphone. If the detected receive signal is not greater than the detected transmit signal by the threshold, the process proceeds to decision 507. If the detected receive signal is greater than the detected transmit signal by the threshold, however, the process proceeds to step 505 where the holdover time is initialized for the receive state. From step 505, the process advances to step 506 where it causes the speakerphone to enter the receive state.

At decision 507, the process checks to see if the detected transmit signal is greater than the transmit noise by a certain threshold. If the detected transmit signal is greater than the transmit noise by the desired amount, the holdover timer is reinitialized at step 508, the process returns to step 501 and the speakerphone remains in the transmit state. Each time the holdover timer is reinitialized for a certain state, the speakerphone will remain minimally in that state for the period of the holdover timer, 1.2 seconds.

If at decision 507, the process finds that the detected transmit signal is less than the transmit noise by a certain threshold, i.e., no speech from the near-end party, the process advances to the decision 509 where it determines if the holdover timer has expired. If the holdover timer has not expired, the process returns to step 501 and the speakerphone remains in the transmit state. If the holdover timer has expired, the process advances to step 510 and the speakerphone returns to the idle state.

Figure 6:
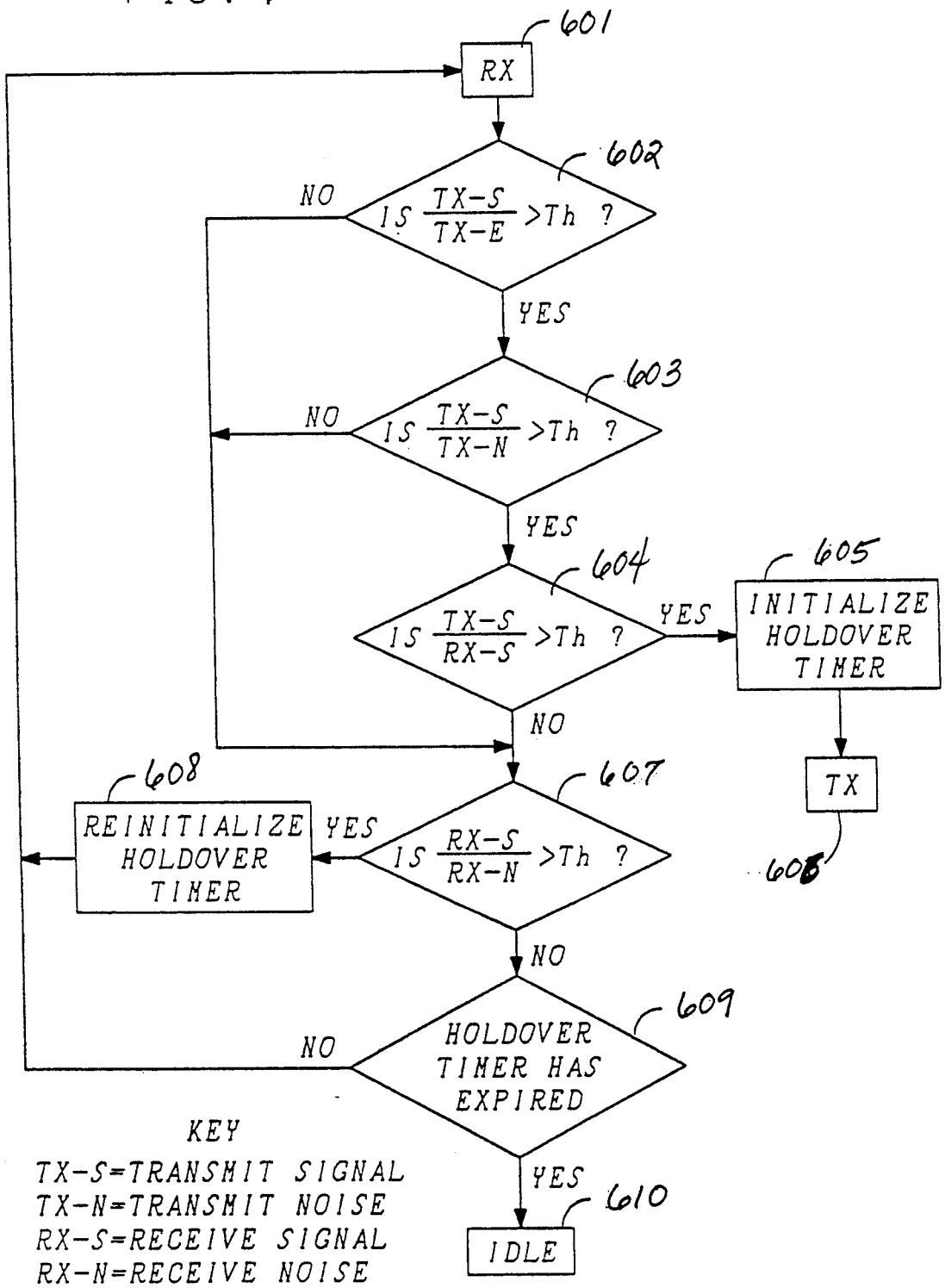
FIG. 6 depicts a flow chart illustrating the operation of the speakerphone of FIG. 2 in determining whether to remain in the receive state or to move from the receive state to the transmit state or idle state.

Referring next to FIG. 6, there is shown a flow chart illustrating in greater detail the operation of the speakerphone 200 in determining whether to remain in the receive state or move from the receive state to either the transmit state or idle state. The process is entered at step 601 wherein the speakerphone has entered the receive state. From this step, the process advances to the decision 602 where a determination is made as to whether the detected transmit signal exceeds the expected transmit signal by a certain threshold. If the detected transmit signal does not exceed the expected transmit signal by the threshold, the process advances to decision 607. If the detected transmit signal exceeds the expected transmit signal by the threshold, however, the process proceeds to step 603 where the detected transmit signal is examined to determine if it is greater than the transmit noise by a certain threshold. If the detected transmit signal is not greater than the transmit noise by this threshold, the process advances to decision 607. If the detected transmit signal is greater than the transmit noise by the desired amount, the process proceeds to decision 604.

At decision 604, a determination is made as to whether the detected transmit signal is greater than the detected receive signal by a certain threshold. This decision is applicable when the far-end party and the near-end party are both speaking and the near-end party is attempting to break-in and change the state of the speakerphone. If the detected transmit signal is not greater than the detected receive signal by the threshold, the process proceeds to decision 607. If the detected transmit signal is greater than the detected receive signal by the threshold, however, the process proceeds to step 605 where the holdover timer is initialized for the transmit state. From step 605, the process advances to step 606 where it causes the speakerphone to enter the transmit state.

At decision 607, the process checks to see if the detected receive signal is greater than the receive noise by a certain threshold. If the detected receive signal is greater than the receive noise by the desired amount, the holdover timer is reinitialized at step 608, the process returns to step 601 and the speakerphone remains in the receive state.

If at decision 607, the process finds that the detected receive signal is less than the receive noise by a certain threshold, i.e., no speech from the far-end party, the process advances to the decision 609 where it determines if the holdover timer has expired. If the holdover timer has not expired, the process returns to step 601 and the speakerphone remains in the receive state. If the holdover timer has expired, the process advances to step 610 and the speakerphone returns to the idle state.

Figure 7:
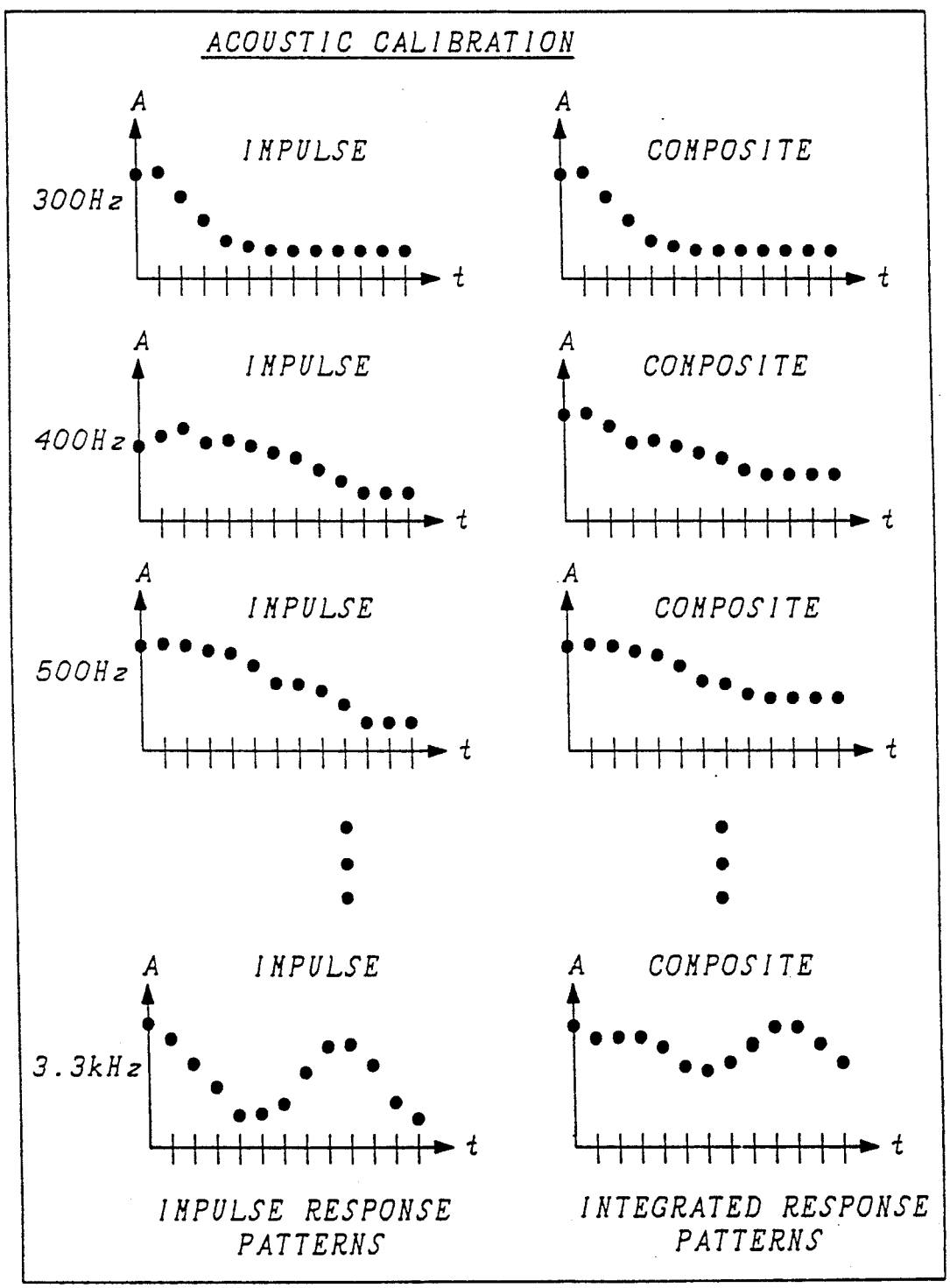
FIG. 7 are illustrative waveforms which depict impulse and composite characterizations of an acoustic environment measured by the speakerphone of FIG. 2.

Referring now to FIG. 7, there is shown illustrative waveforms which provide an impulse and a composite characterization of an acoustic environment obtained during the acoustic calibration process performed by the speakerphone 200. A tone signal, generated between 300 Hz and 3.3 KHz in fifty logarithmically spaced frequency steps, is applied to the loudspeaker 212 of the speakerphone and the return echo for each tone measured by the microphone 211 and analyzed by the computer 210.

To start the measurement sequence of the calibration process, the first tone burst of 300 Hz is generated or launched into the environment for 20 milliseconds in duration. At the end of this tone burst, the first measurement is made. Samples of the return echo for each generated tone burst are initially taken at 2 millisecond intervals for a total sampling period of 20 milliseconds. The amplitude of the return echo is stored in, by way of example, ten storage bins in an acoustic buffer in the computer 210, each of these storage bins receiving and initially storing the samples in ten 2 millisecond periods. At the end of the 20 millisecond period, a 50 millisecond quiet period is provided in order to prevent any echoes still present in the room from the immediately preceding tone burst from affecting the measurement of the following tone burst. After the 50 millisecond quiet period, the second 20 millisecond tone burst of 400 Hz is generated which is followed by the next 20 millisecond measurement interval and 50 millisecond quiet interval. This technique of generated each tone burst, followed by measuring the echo response from that tone burst and a quiet period, is continued throughout the measurement sequence.

The sample impulse responses shown in FIG. 7 are for the four frequencies, 300 Hz, 400 Hz, 500 Hz, and 3.3 KHz. As illustrated in this figure, the 300 Hz response initially has a fairly high amplitude (A), but the energy quickly dissipates after the tone stops. In the 400 Hz response, its amplitude (A) is initially lower, however, the energy does not dissipate as rapidly as in the 300 Hz response. And the energy in the 500 Hz response dissipates even slower than the 300 Hz and the 400 Hz impulse responses.

A composite waveform is shown next to each 300 Hz, 400 Hz and 500 Hz impulse response. This composite waveform represents an integrated response pattern of the impulse responses. The 300 Hz impulse response and the 300 Hz composite response are identical since this is the first measured response. The subsequent composite responses are modified based on the new information that comes in with each new impulse response. If that new information shows any 2 millisecond time interval with a higher amplitude return than is then on the composite response for the corresponding time interval, the old information is replaced by the new information. If the new information has a lower amplitude return than that on the composite for that corresponding time interval, the old information is retained on the composite response. The 3.3 KHz frequency tone is the last of the 50 tones to be generated. If the echoes dissipate rather quickly, as is typical for a room that has good acoustics, then the composite response after this tone represents, for each 2 millisecond time interval, the acoustic coupling that may be encountered by the speakerphone during operation, independent of frequency. In such a case, the composite response may function directly as the time-domain acoustic response for the room.

If the room has harsh acoustics, however, this composite response can not adequately characterize the acoustics of the room and function as the time-domain acoustic response. As earlier described herein, the acoustic echoes of such rooms generally remain at a detectable level long after the time period for measuring the composite representation has expired. Under such a condition, the composite response alone is unable to provide a reasonable prediction for the acoustic coupling that may be encountered by the speakerphone during operation.

Figure 8:
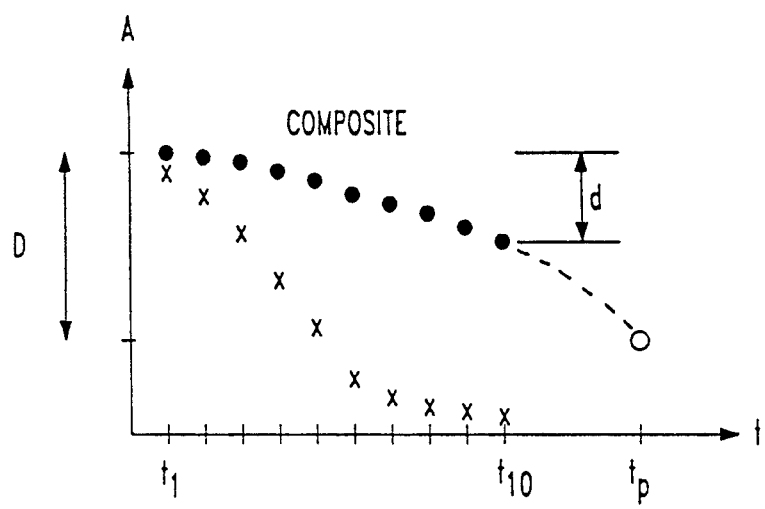
FIG. 8 is an illustrative waveform which depicts a composite characterization of both a favorable and a harsh acoustic environment measured by the speakerphone of FIG. 2.

Referring next to FIG. 8, there is shown an illustrative waveform which depicts a composite characterization of both a favorable and a harsh acoustic environment. In the favorable environment, the acoustic return includes short duration echoes "x" that dissipate to a desired echo decay value "D" within the measuring period ($t_1-T_{10}$) for the composite response. In the harsh acoustic environment, the acoustic return includes long duration echoes "*" that do not dissipate to the desired echo decay value D within the measuring period $t_1-t_{10}$ for the composite response. Rather, these echoes are shown as dissipating only to some level "d" and, as a result, cause unstable operation in the speakerphone since it is unable to adapt its operating parameters to the acoustic environment.

For those rooms having a harsh acoustic environment, the time-domain acoustic response is determined by the calibration circuitry in the speakerphone by first generating an echo decay parameter that is indicative of the duration of any echoes present in the room. The echo decay parameter is an estimate for a specific time interval ($t_1-t_p$) when the amplitude level of the acoustic response for the tone burst signal dissipates to the predetermined level D. this echo decay parameter is also advantageously determined from the same series of tone bursts generated into the room by the calibration circuitry.

In order to generate the echo decay parameter, the calibration circuitry first generates a composite representation of the acoustic response for those echoes having the largest returned amplitude level measured at each one of multiple predetermined time intervals. By examining the amplitude level in the composite representation at each of the multiple predetermined time intervals, $t_1$ through $t_{10}$, an accurate estimate for the time required for the echoes to dissipate to the desired level D is generated. In a more coarse but adequate approximation, the amplitude level in the composite representation at intervals $t_1$ and $t_{10}$ of the multiple predetermined time intervals may be examined and, again an estimate for the time required for the echoes to dissipate to the desired level D is generated. And from the echo decay parameter and the composite representation, the time-domain acoustic response is generated. This time-domain acoustic response is generated by adjusting both the length of the multiple predetermined intervals of the composite representation and the amplitude level stored in each of these intervals. The lengths of the predetermined intervals are adjusted such that the sum of these intervals is made equal to the specific time interval at which the amplitude level of the acoustic response for the tone burst signal dissipates to the predetermined level. The amplitude levels are adjusted such that the last one of the predetermined intervals of the composite representation contains an adjusted amplitude at or below the predetermined level.

If after performing a first measurement of the room acoustics at a prescribed first time period, the calibration circuitry determines that the room echoes have not dissipated to an acceptable level (a predetermined minimum echo decay criterion) for generating a satisfactory echo decay parameter representative of these echoes, the calibration circuitry regenerates the tone burst into the room a second time and then measures the resulting level of the acoustic response over an extended time period.

Figure 9:
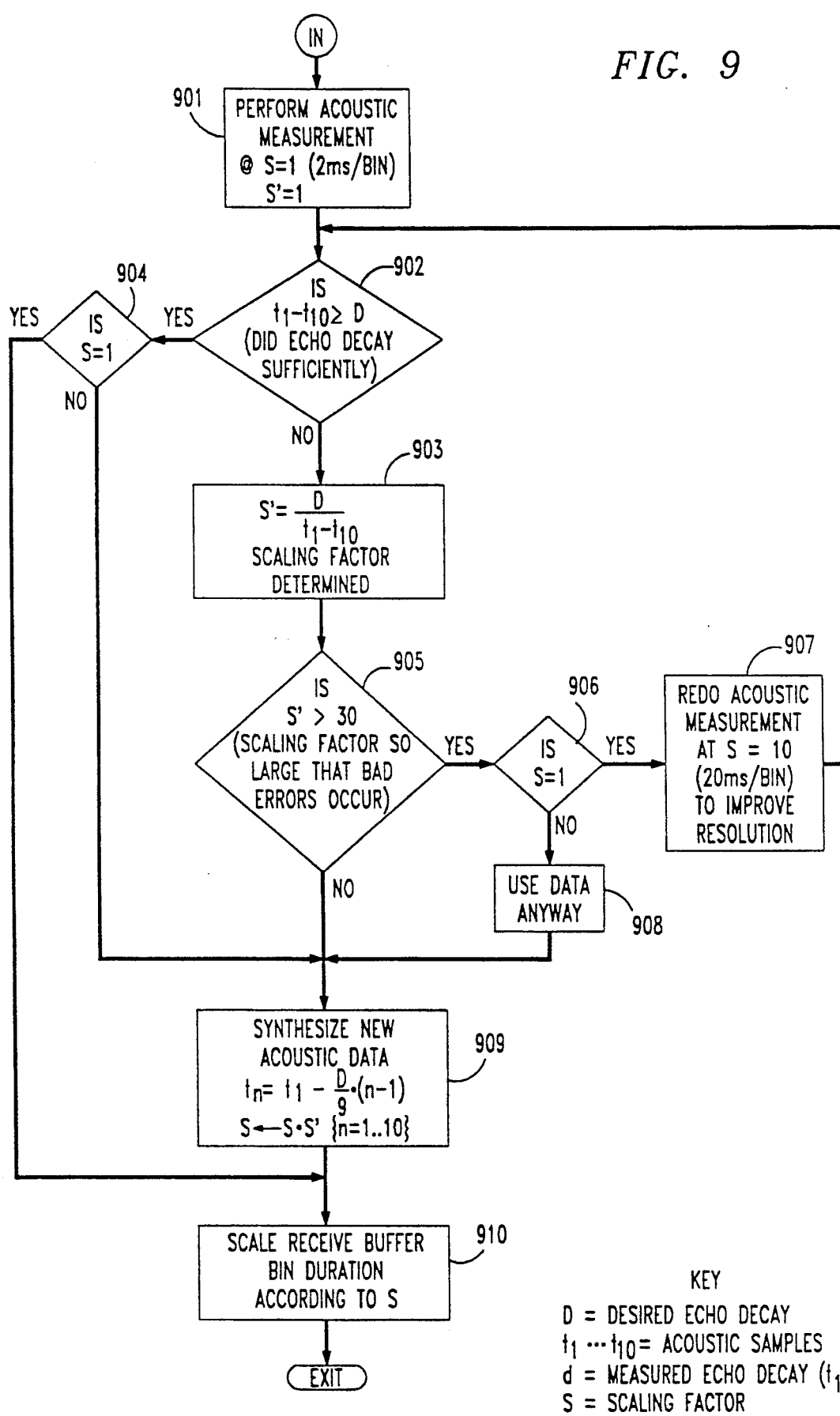
FIG. 9 depicts a flow chart illustrating the operation of the speakerphone of FIG. 2 in determining the type of acoustic environment in which the speakerphone is employed.

Referring next to FIG. 9, there is shown a flow chart illustrating the operation of the speakerphone 200 in accordance with the invention in determining the type of acoustic environment in which the speakerphone is employed. Through use of this acoustic calibration process, the speakerphone is able to determine the acoustic environment of both large and small rooms having either harsh or favorable acoustics and then adjust its operating parameters for optimum operation in either acoustic environment. The process is entered at step 901 where the initializing parameters are set and an acoustic measurement is performed for a first time through a composite characterization of the acoustic environment, as previously described herein with reference to FIG. 7. The initializing parameters include setting a scaling factor "S" to a value of 1 and clearing an acoustic buffer in the compute 210 of any retained samples of previously measured return echoes. In setting the scaling factor S, each one of the ten storage bins in the buffer is assigned an initial value of 2 milliseconds each in which one sample per bin is stored. Thus the initial data on the return echoes will be reflective of the dissipation rate of the echoes in the room within a 20 millisecond period.

After the acoustic measurement is performed, the process advances to decision 902 where the echo data stored in the acoustic buffer is examined to determine if the echo has dissipated to the desired predetermined level D within the 20 millisecond period. This predetermined level of the echo decay value is selected as 20 dB down from the initial return echo level. In order for this criteria to be met, the last received sample in the acoustic buffer must be 20 dB lower in value than the first received sample in the acoustic buffer. If it is determined, in decision 902 that the data in the acoustic buffer does not meet the desired echo decay value, the process advances to step 903 where a temporary scaling factor S' reflective of an echo decay parameter is determined. The temporary scaling factor S' is determined using the desired echo decay value D and the measured echo decay value d for the returned echo over the 20 millisecond period. The value of d is obtained by subtracting the level of the acoustic response stored in the last bin of the acoustic buffer from the level of the acoustic response stored in the first bin of the acoustic buffer. Thus the echo decay parameter as represented by the temporary scaling factor S' provides a way of extrapolating what time interval would be required for the amplitude of the returned acoustic response to dissipate to the desired predetermined level.

If it is determined at decision 902 that the echo has decayed sufficiently within the selected time period, in this instance 20 milliseconds, the process advances to decision 904. At this decision, a determination is made as to whether the scaling factor S then being used is assigned the value 1. If yes, this is an indication that the acoustic measurement process was performed only once due to the speakerphone then being in a favorable acoustic environment and, as a result, determining an echo decay parameter was not necessary. For this condition, the acoustic measurement is complete and the process advances to step 910. If the scaling factor S is other than the value 1, the process advances to step 909.

Referring once again to step 903, after the temporary scaling factor S' is determined, the process advances to decision 905 where a determination is then made as to whether this temporary scaling factor S' is greater than some arbitrary number such as for example, 30. The size of the scaling factor affects the reliability of the measurement to an extent since when only a small difference is provided between the first sample and the last sample in the acoustic buffer, there is the potential for a very large error in making the echo decay prediction. Thus if the temporary scaling factor S' is larger than 30, the process advances to the decision 906 where a determination is made as to whether the scaling factor S is then equal to the value 1. If the scaling factor S is equal to the value 1, the process advances to step 907 where the acoustic measurement is performed for a second time. For this second measurement, the scaling factor S is set to equal 10, with a resolution of 20 milliseconds per storage bin. Samples of the return echo for each tone signal generated are thus taken at 20 millisecond intervals for a total sample period of 200 milliseconds. From Step 907, the process returns to the decision 902 where once again, a determination is made as to whether the room echoes have decayed to the desired predetermined level.

If the scaling factor S is not equal to the value 1 in the decision 906, this is an indication that the acoustic measurement has been performed at least twice and the echoes in the room are remaining for an extremely long period. In this instance, the process advances to step 908 which provides instructions to use the existing data and make a reasonable prediction as to when the room echoes will decay to the desired predetermined level.

From the step 908, as well as from decisions 904 and 905, the process advances to step 909 where a time-domain acoustic response for the environment is determined. This acoustic response is determined through the synthesis of the new data based on the echo decay parameter as represented by the selected scaling factor and also the data that is then set in the acoustic buffer. This synthesis is achieved by adjusting the time period for each one of the ten storage bins in the acoustic buffer such that their sum is equal to the specific time interval at which the predicted amplitude of the returned acoustic response dissipates to the predetermined level. This synthesis is further achieved by inserting adjusted amplitude values into each bin of the acoustic buffer such that the last one of the storage bins contains an adjusted amplitude value at or below the predetermined level.

From step 909, the process advances to step 910 where the acoustic data information is provided for use by the computer 210 during normal operation of the program routines of the speakerphone. The time-domain acoustic response and the scaling factor are both saved for use as part of the normal program routines. The scaling factor is used as part of the normal program routine in determining the manner in which samples are stored in the receive buffer. The samples stored in the receive buffer also are scaled in the same way as those samples in the acoustic buffer so that they track in time with the time-domain acoustic response generated by the acoustic measurement process. From step 910, the program is exited.

The time-domain acoustic response, which provides a measure of the initial characterization of the room acoustic environment in which the speakerphone operates, is used in a number of ways. The time-domain acoustic response is used for setting a switchguard threshold which insures that receive speech, if coming out of the loudspeaker, is not falsely detected as transmit speech and returned to the far-end party.

The time-domain acoustic response is also used for determining the total amount of loop loss necessary for proper operation of the speakerphone. The amount of receive speech signal that is returned through the microphone from the loudspeaker is used as part of the equation which also includes the amount of hybrid return, the amount of loss inserted by the programmable attenuators and the gain setting of the volume control to determine the total amount of loop loss.

The time-domain acoustic response is further used in determining the expected transmit level. This expected transmit level is obtained from a convolution of the time-domain acoustic response with the receive speech samples. The receive speech samples are available in real time for the immediately preceding specific time interval with sample points being provided at adjusted time intervals determined by the acoustic measurement routine described in FIG. 9. The value of the sample points occurring at each adjusted time interval in the receive response are convolved with the value of the sample points corresponding to the same adjusted time intervals in the time-domain acoustic response. In this convolution, the sampled values of the received speech response are, on a sample point by sample point basis, multiplied by the corresponding values of the sample points contained in the time-domain acoustic response. The maximum product is then selected as a numerical value which represents the maximum point of convolution of the immediately preceding specific time interval of receive speech and the corresponding specific time interval of initial room characterization. This numerical value represents the amount of receive speech energy that is still in the room and will be detected by the microphone.

The following example illustrates how the convolution of the time-domain acoustic response with the received speech provides for more efficient operation of the speakerphone. If, by way of example, the near-end party begins talking and the speakerphone is in the receive state receiving speech from the far-end party, a certain amount of the signal coming out of the loudspeaker is coupled back into the microphone. The speakerphone has to determine whether the speech seen at the microphone is due solely to acoustic coupling, or whether it is due to the near-end talker. This determination is essential in deciding which state the speakerphone should be entering. To make this determination, the computer convolves the time-domain acoustic response of the room with the receive speech signal to determine the level of speech seen at the microphone that is due to acoustic coupling. If the amount of signal at the microphone is greater than expected, then the computer knows that the near-end user is trying to interrupt and can permit a break-in; otherwise, the speakerphone will remain in the receive state.

When a speakerphone type device is operated in a near full or full duplex mode, the far-end party's speech emanating from the loudspeaker is coupled back into the microphone and back through the telephone line to the far-end. Because of the proximity of the loudspeaker to the microphone, the speech level at the microphone resulting from speech at the loudspeaker is typically much greater than that produced by the near-end party. The result is a loud and reverberant return echo to the far-end. To alleviate this unpleasant side effect of near full or full duplex operation, an echo suppression process, which inserts loss in the transmit path as appropriate, is employed.

Figure 10:
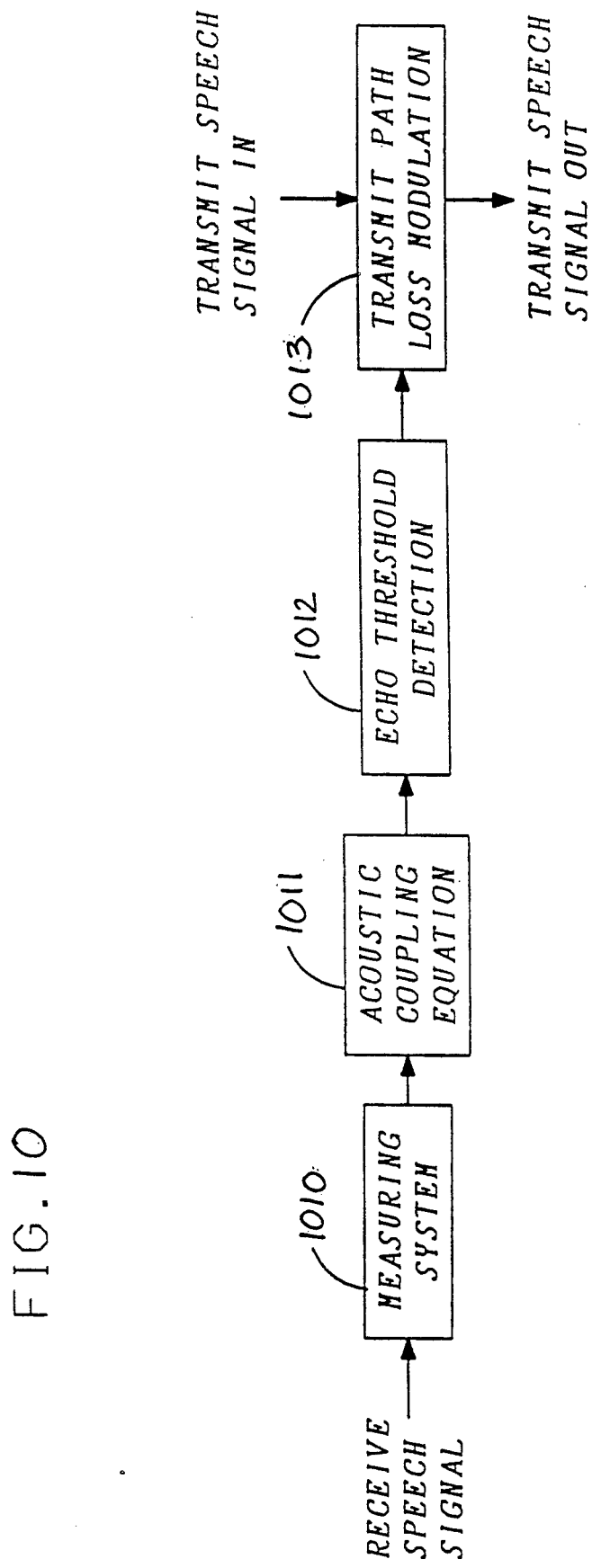
FIG. 10 is a block representation of the functional components of a speakerphone operable in providing echo suppression loss insertion.

A diagram generally illustrating the insertion of echo suppression loss during near full or full duplex operation is shown in FIG. 10. The speech signal in the receive path is measured by a measuring system 1010. Such a measuring system, by way of example, is available from high pass filter 233, envelope detector 235 and logarithmic amplifier 237 shown in FIG. 2. The output of measuring system 1010 is passed through an acoustic coupling equation 1011 in order to include the effects of acoustic coupling on the signal to be seen at the microphone. The acoustic coupling equation could be as simple as a fast attack, slow decay analog circuit. In this implementation, the acoustic coupling equation is the time-domain acoustic response that is generated during the acoustic calibration portion of the calibration process, described earlier herein. The output of the equation is the expected transmit signal level also described earlier herein. The resulting signal is then used to provide a control signal for the modulation of the transmit path loss. An echo threshold detection circuit 1012 monitors the amplitude of the control signal from the acoustic coupling equation 1011. When the control signal exceeds a predetermined threshold (below which the return echo would not be objectionable to the far-end party) transmit loss which tracks the receive speech is inserted into the transmit path by the modulation circuit 1013.

By monitoring the transmit and receive speech signals, the process determines when the speech signal into the microphone is a result of acoustically coupled speech from the loudspeaker. While the speakerphone is operating, the expected transmit signal level is also constantly monitored. This level is a direct indication of loudspeaker to microphone coupling and loop switched loss. This expected transmit level will tend to get larger as the speakerphone approaches full duplex operation. When this signal exceeds an echo threshold (below which the return echo would not be objectionable to the far-end party), additional loss is inserted into the transmit path. This echo suppression loss, when needed, tracks the receive speech envelope at a syllabic rate after a 1 to 5 millisecond delay.

Figure 11:
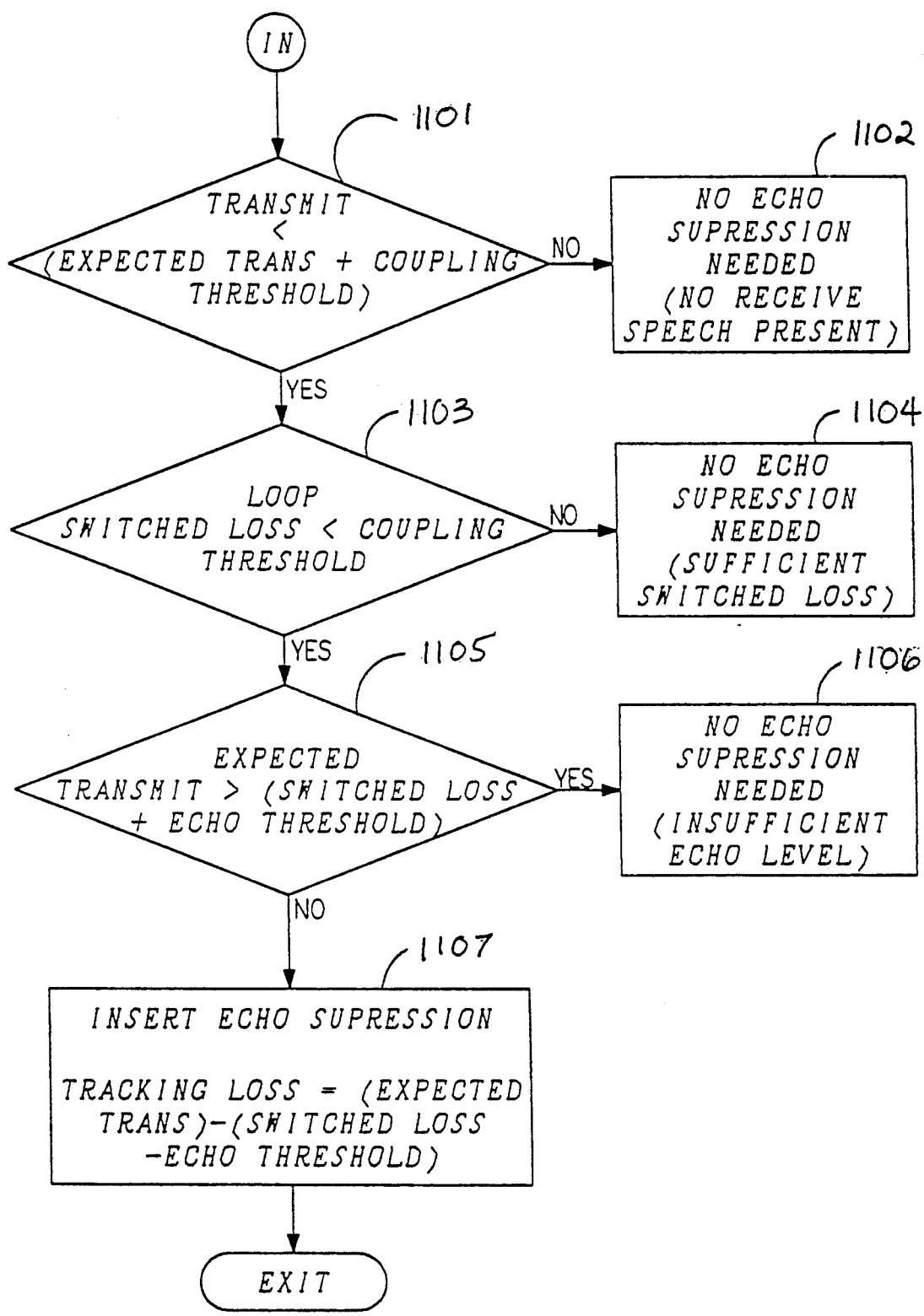
FIG. 11 depicts a flow chart illustrating the operation of the speakerphone of FIG. 9, in the application of echo suppression loss insertion.

Referring next to FIG. 11, there is shown a flow diagram illustrating the decision making process for the application of echo suppression loss. The process is entered at decision 1101 where the transmit signal level is compared with the expected transmit signal level plus a coupling threshold. If the expected transmit signal level plus the coupling threshold is less than the measured transmit signal, the process advances to step 1102 since receive speech is not present and echo suppression is therefore not necessary. If the expected transmit signal level plus the coupling threshold is greater than the measured transmit signal, the process advances to decision 1103 since the speakerphone is emanating speech from the loudspeaker that may need to be suppressed.

At decision 1103, a determined is made as to whether the loop switched loss is great enough to obviate the need for additional echo suppression loss. If loop switched loss is greater than the coupling threshold, the process advances to step 1104 since the switched loss will prevent objectionable echo to the far-end and echo suppression is not necessary. If loop switched loss is not great enough to provide sufficient echo reduction, however, the process advances to decision 1105.

At decision 1105, a determination is made as to whether the expected level of the transmit signal is greater than the loop switched loss plus an echo threshold. If so, the process advances to step 1106 since the return echo would not be objectionable to the far-end party and echo suppression is not necessary. If, however, the expected level of the transmit signal is less than the loop switched loss plus an echo threshold, echo suppression is necessary and the process advances to step 1107. The echo suppression is then inserted into the transmit path at step 1107 as follows: loss=expected transmit level−(loop switched loss−echo threshold).

Although a specific embodiment of the invention has been shown and described, it will be understood that it is but illustrative and that various modifications may be made therein without departing from the spirit and scope of the invention as defined in the appended claims.

We claim:

1. In a voice switching apparatus for processing speech signals on a communication line, the apparatus including means for switching between a receive state for receiving speech signals from the communication line and a transmit state for transmitting speech signals over the communication line, an acoustic calibration circuit for determining the type of acoustic environment in which the voice switching apparatus is employed, the calibration circuit comprising:

means for generating a tone burst signal in an environment, the tone burst signal comprising multiple frequency signals generated separately at different time intervals;

means responsive to the return of the tone burst signal to said apparatus for generating a composite representation of the acoustic response for each one of the multiple frequency signals having the largest returned amplitude level measured at each one of multiple predetermined time intervals;

scaling means for generating an echo decay parameter for providing an estimate for a specific time interval when the amplitude level of the acoustic response for the multiple frequency signals dissipates to a predetermined level, the echo decay parameter being indicative of the duration of echoes from the tone burst signal and providing a time-domain acoustic response of said environment; and calibration means operably responsive to the scaling means for adjusting threshold switching levels at which the apparatus switches between the receive state and the transmit state.

2. The acoustic calibration circuit as in claim 1 wherein the scaling means generates the echo decay parameter by examining the amplitude level in the composite representation at least the first one and last one of the multiple predetermined time intervals.

3. The acoustic calibration circuit as in claim 2 wherein the scaling means includes means for generating the time-domain acoustic response of said environment, the scaling means generating a time interval for the time-domain acoustic response by adjusting the period of each of the multiple predetermined time intervals of the composite representation so that the sum of these adjusted time intervals is equal to the specific time interval at which the amplitude level of the acoustic response dissipates to the predetermined level.

4. The acoustic calibration circuit as in claim 3 wherein the scaling means responsive to the echo decay parameter generates multiple adjusted amplitudes for the time domain acoustic response, the adjusted amplitudes being inserted into the adjusted time intervals in a manner such that the last of the adjusted multiple time intervals contains an adjusted amplitude at or below the predetermined level.

5. The acoustic calibration circuit as in claim 1 wherein the scaling means measures the acoustic response for the tone burst signal generated in said environment over a predetermined first time period.

6. The acoustic calibration circuit as in claim 5 wherein the tone burst signal generating means further comprises means for regenerating the tone burst signal for measuring of the acoustic response by the scaling means in said environment over a predetermined second time period, this second time period being longer than the first time period and the tone burst signal being regenerated by the tone burst signal generating means when the amplitude level of the acoustic response for the multiple frequency signals fails to dissipate to a predetermined level over the predetermined first time period.

7. In a voice switching apparatus for processing speech signals on a communication line, the apparatus including means for switching between a receive state for receiving speech signals from the communication line and a transmit state for transmitting speech signals over the communication line, and variable switched loss means for alternately inserting loss in a receive path for attenuating the speech signals received from the communication line and in a transmit path for attenuating the speech signals for transmission over the communication line, an acoustic calibration circuit for determining the type of acoustic environment in which the voice switching apparatus is employed, the calibration circuit comprising:

means for generating a tone burst signal in an environment, the tone burst signal comprising multiple frequency signals generated separately at different time intervals;

means responsive to the return of the tone burst signal to said apparatus for generating a composite representation of the acoustic response for each one of the multiple frequency signals having the largest returned amplitude level measured at each one of multiple predetermined time intervals; and scaling means for generating an echo decay parameter for providing an estimate for a specific time interval when the amplitude level of the acoustic response for the multiple frequency signals dissipates to a predetermined level, the echo decay parameter being indicative of the duration of echoes from the tone burst signal and providing a time-domain acoustic response of said environment; and calibration means operably responsive to the scaling means for adjusting threshold switching levels at which the apparatus switches between the receive state and the transmit state.

8. The acoustic calibration circuit as in claim 7 wherein the scaling means generates the echo decay parameter by examining the amplitude level in the composite representation at at least the first one and last one of the multiple predetermined time intervals.

9. The acoustic calibration circuit as in claim 8 wherein the scaling means includes means for generating the time-domain acoustic response of said environment, the scaling means generating a time interval for the time-domain acoustic response by adjusting the period of each of the multiple predetermined time intervals of the composite representation so that the sum of these adjusted time intervals is equal to the specific time interval at which the amplitude level of the acoustic response dissipates to the predetermined level.

10. The acoustic calibration circuit as in claim 9 wherein the scaling means responsive to the echo decay parameter generates multiple adjusted amplitudes for the time domain acoustic response, the adjusted amplitudes being inserted into the adjusted time intervals in a manner such that the last of the adjusted multiple time intervals contains an adjusted amplitude at or below the predetermined level.

11. The acoustic calibration circuit as in claim 7 wherein the scaling means measures the acoustic response for the tone burst signal generated in said environment over a predetermined first time period.

12. The acoustic calibration circuit as in claim 11 wherein the tone burst signal generating means further comprises means for regenerating the tone burst signal for measuring of the acoustic response by the scaling means in said environment over a predetermined second time period, this second time period being longer than the first time period and the tone burst signal being regenerated by the tone burst signal generating means when the amplitude level of the acoustic response for the multiple frequency signals fails to dissipate to less than a predetermined level over the predetermined first time period.

13. A method of determining the type of acoustic environment in which a voice signal controller is employed, the voice signal controller being connectable to a communication line and switching between a receive state for receiving speech signals from the communication line and a transmit state for transmitting speech signals over the communication line, the method comprising the steps of:
   generating a tone burst signal in an environment, the tone burst signal comprising multiple frequency signals generated separately at different time intervals and for a common fixed time period;
   measuring the return of the tone burst signal to said controller for generating a composite representation of the acoustic response for each one of the multiple frequency signals having the largest returned amplitude level measured at each one of multiple predetermined time intervals;
   generating an echo decay parameter for providing an estimate for a specific time interval when the amplitude level of the acoustic response for the multiple frequency signals dissipates to a predetermined level, the echo decay parameter being indicative of the duration of echoes from the tone burst signal and providing a time-domain acoustic response of said environment; and
   adjusting threshold switching levels at which the controller switches between the receive state and the transmit state responsive to the measuring step.

14. The method of determining the type of acoustic environment as in claim 13 wherein the measuring step generates the echo decay parameter by examining the amplitude level in the composite representation at at least the first one and last one of the multiple predetermined time intervals.

15. The method of determining the type of acoustic environment as in claim 14 wherein the echo decay parameter generating step further includes the step of generating a time interval for the time-domain acoustic response by adjusting the period of each of the multiple predetermined time intervals of the composite representation so that the sum of these adjusted time intervals is equal to the specific time interval at which the amplitude level of the acoustic response dissipates to the predetermined level.

16. The method of determining the type of acoustic environment as in claim 15 wherein the echo decay parameter generating step further includes the step of generating multiple adjusted amplitudes for the time domain acoustic response, the adjusted amplitudes being inserted into the adjusted time intervals in a manner such that the last of the adjusted multiple time intervals contains an adjusted amplitude at or below the predetermined level.

17. The method of determining the type of acoustic environment as in claim 13 wherein the echo decay parameter generating step measures the acoustic response for the tone burst signal generated in said environment over a predetermined first time period.

18. The method of determining the type of acoustic environment as in claim 17 wherein the tone burst generating step further includes the step of regenerating the tone burst signal for measuring of the acoustic response by the echo decay parameter generating step in said environment over a predetermined second time period, this second time period being longer than the first time period and the tone burst signal being regenerated by the tone burst signal generating step when the amplitude level of the acoustic response for the multiple frequency signals fails to dissipate to a predetermined level over the predetermined first time period.

19. A method for use in an apparatus which operates as a function of a time-domain acoustic response of the environment in which said apparatus is located, said method being a method for determining said time-domain acoustic response and comprising the steps of:
   launching at least a first acoustic signal into said environment;
   measuring the time-domain acoustic response of said environment over a first predetermined time period in response to echoes of said acoustic signal returned to said apparatus; and
   if the measured time-domain acoustic response does not meet a first predetermined minimum echo decay criterion, then determining the time-domain acoustic response of said environment over a second predetermined time period that includes and extends beyond said first predetermined time period.

20. The invention of claim 19 wherein said determining step includes the step of generating an estimate of the time-domain acoustic response of said environment over said second predetermined time period by extrapolating from said time-domain acoustic response measured over said first predetermined time period.

21. The invention of claim 19 wherein said determining step comprises the further steps of launching at least a second acoustic signal into said environment and measuring the time-domain acoustic response of said environment over a third predetermined time period in response to echoes of said second acoustic signal returned to said apparatus if the first measured time-domain acoustic response does not meet a second predetermined minimum echo decay criterion which is less stringent than said first predetermined minimum echo decay criterion.

22. The invention of claim 21 wherein each of said first and second criteria is the decay of said echoes by a respective predetermined dB amount over said first predetermined time period.

23. The invention of claim 22 wherein said apparatus is a voice switching apparatus which processes speech signals on a communication line, the apparatus being operative for switching between a receive state for receiving speech signals from the communication line and a transmit state for transmitting speech signals over the communication line and wherein said method includes the further step of controlling said switching as a function of the time-domain acoustic response determined by said determining step.

* * * * *